(12) United States Patent
Johnson et al.

(10) Patent No.: US 6,600,977 B2
(45) Date of Patent: Jul. 29, 2003

(54) GLIDESLOPE MONITOR FOR AIRCRAFT

(75) Inventors: Steve C. Johnson, Issaquah, WA (US); Yasuo Ishihara, Kirkland, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/916,633

(22) Filed: Jul. 27, 2001

(65) Prior Publication Data

US 2002/0040263 A1 Apr. 4, 2002

Related U.S. Application Data

(60) Provisional application No. 60/226,400, filed on Aug. 18, 2000.

(51) Int. Cl.[7] .................................................. G08G 5/00
(52) U.S. Cl. .............................. 701/17; 701/9; 701/18; 340/967
(58) Field of Search .............................. 701/9, 16, 17, 701/18; 340/947, 951, 967, 976

(56) References Cited

U.S. PATENT DOCUMENTS

| | | | | |
|---|---|---|---|---|
| 3,678,256 A | | 7/1972 | Harenberg | 235/150.2 |
| 3,750,176 A | * | 7/1973 | Sawicki et al. | 342/407 |
| 3,947,809 A | | 3/1976 | Bateman | 340/27 |
| 5,631,656 A | * | 5/1997 | Hartman et al. | 342/173 |
| 5,820,080 A | * | 10/1998 | Eschenbach | 244/183 |

* cited by examiner

*Primary Examiner*—Michael J. Zanelli
(74) *Attorney, Agent, or Firm*—Honeywell International Inc.

(57) ABSTRACT

A system, method, and computer program product for alerting an aircraft flight crew of an inconsistency during an instrument landing system (ILS) approach to a selected runway. The system includes a component configured to receive glideslope and localizer signals, and a component configured to determine aircraft approach angle to runway end. Also, a component configured to alert the aircraft flight crew of an approach inconsistency, if the determined aircraft approach angle to runway end is less than a threshold angular value and one or more parameters based on aircraft position and the received glideslope and localizer signals are met. The component configured to determine aircraft approach angle to runway end determines the aircraft approach angle to runway end based on aircraft geometric altitude, a vertical figure of merit, a horizontal figure of merit, runway elevation, and aircraft distance to runway threshold.

24 Claims, 4 Drawing Sheets

GLIDESLOPE MONITOR FOR AIRCRAFT

PRIORITY CLAIM

This application claims priority from co-pending U.S. Provisional application serial No. 60/226,400 entitled "Glideslope Monitor For Aircraft," filed Aug. 18, 2000, the complete disclosure of which is incorporated herein by reference.

BACKGROUND OF THE INVENTION

An Instrument Landing System (ILS) approach is traditionally one of the safest, most accurate precision approach systems. However, there may be occasions when the ILS is out of calibration due to various lack of maintenance, testing, or other reasons. When the ILS is not calibrated or not functioning properly, the glideslope indicator in an aircraft cockpit may indicate that the aircraft is on glideslope when the aircraft is actually below the actual and safe glideslope. The aircraft can fly into the ground if this situation continues.

Therefore, there exists a need to perform some form of back-up check to ensure the ILS is performing properly.

SUMMARY OF THE INVENTION

The present invention includes a system, method, and computer program product for alerting an aircraft flight crew of an inconsistency during an instrument landing system (ILS) approach to a selected runway. The system includes a component configured to receive glideslope and localizer signals, and a component configured to determine aircraft approach angle to runway end. Also, a component configured to alert the aircraft flight crew of an approach inconsistency, if the determined aircraft approach angle to runway end is less than a threshold angular value and one or more parameters based on aircraft position and the received glideslope and localizer signals are met.

In accordance with further aspects of the invention, the component configured to determine aircraft approach angle to runway end determines the aircraft approach angle to runway end based on aircraft geometric altitude, a vertical figure of merit, a horizontal figure of merit, runway elevation, and aircraft distance to runway threshold.

In accordance with other aspects of the invention, the parameters include valid glideslope and localizer signals, the aircraft being on the front course of the ILS approach, the aircraft being within a distance range from the selected runway based on distance to selected runway threshold, horizontal figure of merit, and a runway quality factor, the aircraft being within an angular range from the selected runway based on aircraft true track and selected runway bearing, the aircraft being below a height above runway altitude value based on geometric altitude, a vertical figure of merit, and runway elevation, and the received glideslope and localizer signals indicating that the aircraft is within threshold values of center of the ILS approach.

As will be readily appreciated from the foregoing summary, the invention provides an improved ILS that performs an on-aircraft check if the aircraft is receiving an incorrect indication of being on or nearly on glideslope while the aircraft is actually dangerously below glideslope.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
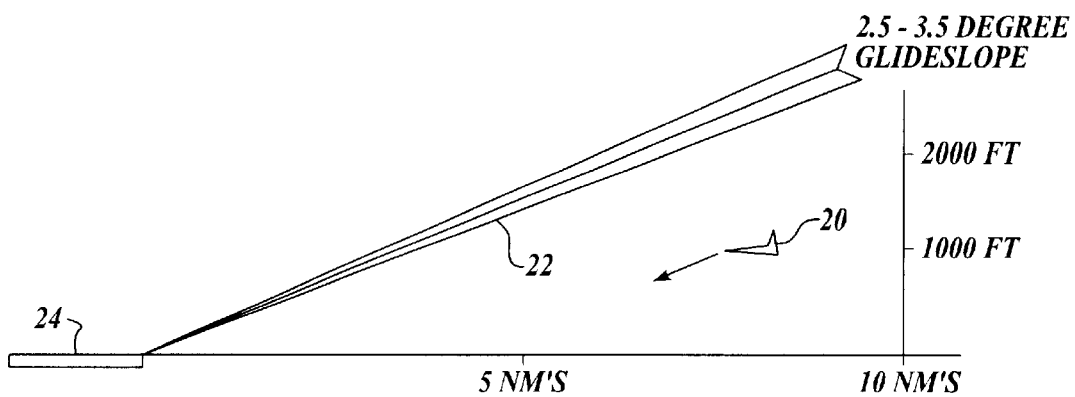
FIG. 1 is a side view of an aircraft on a precision approach to landing.
Figure 2:
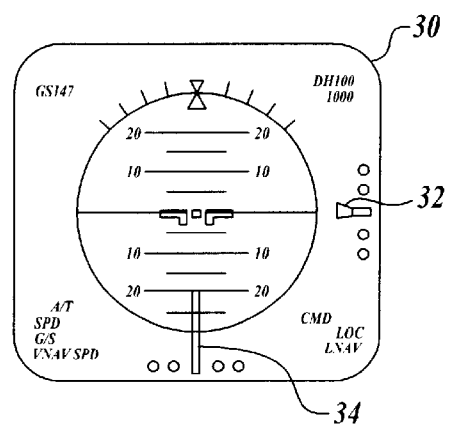
FIG. 2 is a view of a gyroscopic display of the aircraft shown in FIG. 1.

The present invention corrects the problems shown and discussed in FIGS. 1 and 2. FIG. 1 is a side view of an aircraft 20 that is performing an instrument landing system (ILS) approach to an airfield 24. In FIG. 1, the aircraft 20 is about eight nautical miles from the end of the runway and is well below the intended glideslope 22 of the ILS approach.

FIG. 2 illustrates an Artificial Altitude Indicator (AAI) 30 that includes an ILS glideslope indicator 32 and directional indicator 34. The glideslope indicator 32 indicates the aircraft's position relative to the glideslope 22 of the ILS approach. The directional indicator 34 indicates the aircraft's 20 relative position to the centerline of the ILS approach. The indication shown in the AAI 30 is what the flight crew of aircraft 20 is presently viewing. The glideslope indicator 32 is centered in the AAI 30, thereby informing the pilot of the aircraft 20 that the aircraft is on a glideslope. However, as shown in FIG. 1, the aircraft 20 is well below the glideslope 22. In this example, the ILS approach system (i.e., the ILS ground-based portion that is generating the glideslope and directional (localizer) signals) is giving erroneous glideslope information to the aircraft 20, thereby indicating that the aircraft is on glideslope as shown in the AAI 30 but is actually well below the glideslope 22. Also, the directional indicator 34 identifies the aircraft as being on centerline of the ILS approach.

In the example shown in FIGS. 1 and 2, there may be times when an ILS approach landing system has not been updated or calibrated properly thereby sending erroneous glideslope signals to the aircraft. If the flight crew of the aircraft 20 is not double checking aircraft altitude and distance from the runway as they are proceeding on the ILS approach, the flight crew may assume that the glideslope indication that they see on their AAI or comparable device is accurate. If this occurrence proceeds to touch down, this will result in the aircraft landing short of the runway 24.

Figure 3:
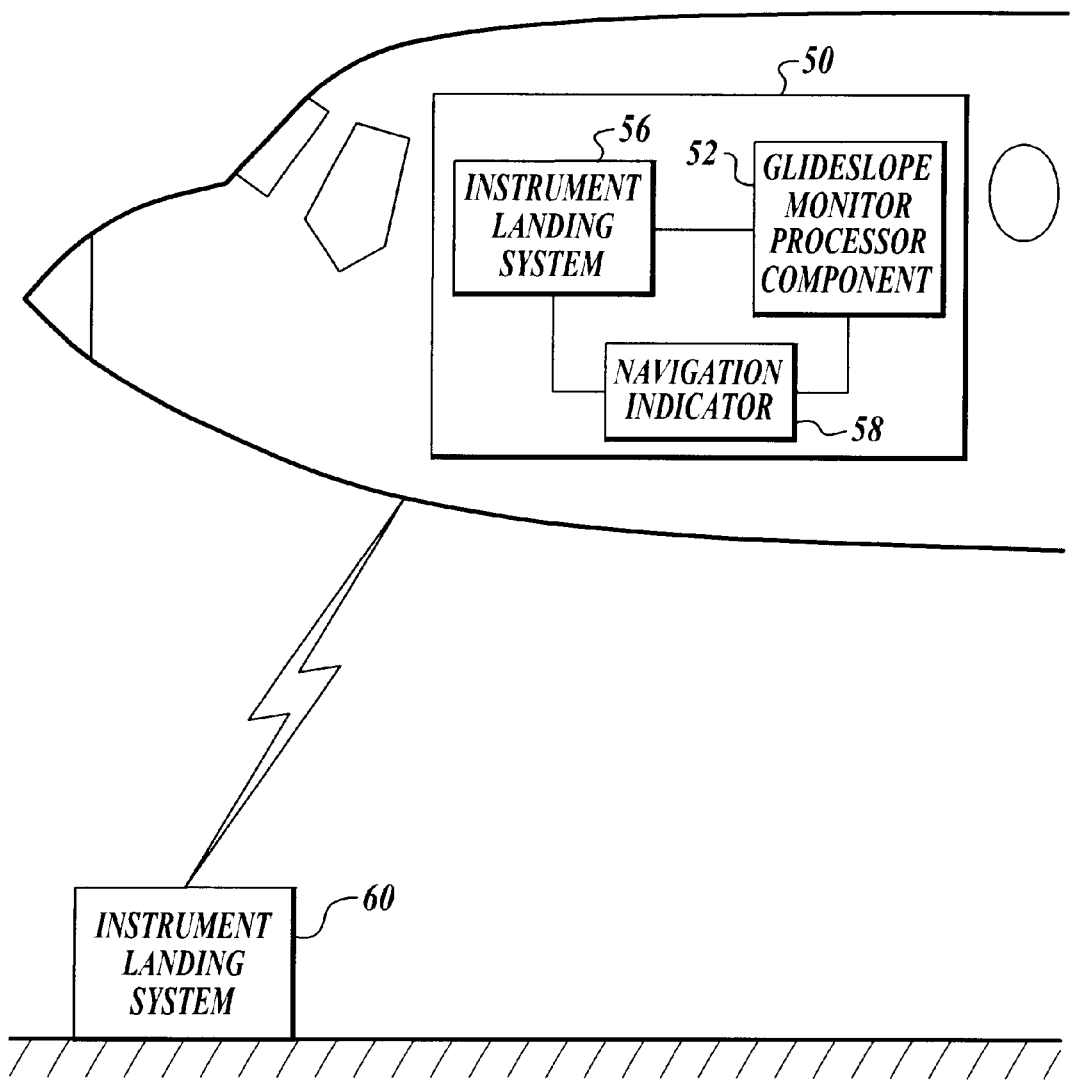
FIG. 3 is a block diagram of aircraft components of the present invention.

The present invention provides a system, method, and computer program product for alerting the flight crew if the condition shown in FIGS. 1 and 2 is occurring. FIG. 3 illustrates a system 50 on board an aircraft for alerting the flight crew of the condition that may occur as shown in FIGS. 1 and 2. The system 50 includes an instrument landing system (ILS) component 56, a glideslope monitor processing component 52, and a navigation indicator 58 that is electrically coupled to the ILS component 56. The ILS component 56 receives glideslope and localizer signals from a land-based ILS 60 that are then processed and sent to the navigation indicator 58 for display to the pilot/flight crew and sent to the glideslope monitor processing component 52. The glideslope monitor processing component 52 receives the localizer and glideslope signals from the instrument landing system 56 and also receives other flight parameter signals and information, as will be described in more detail below, to determine if the signals received from the instrument landing system 56 are accurate with respect to aircraft's actual position.

Figure 4A:
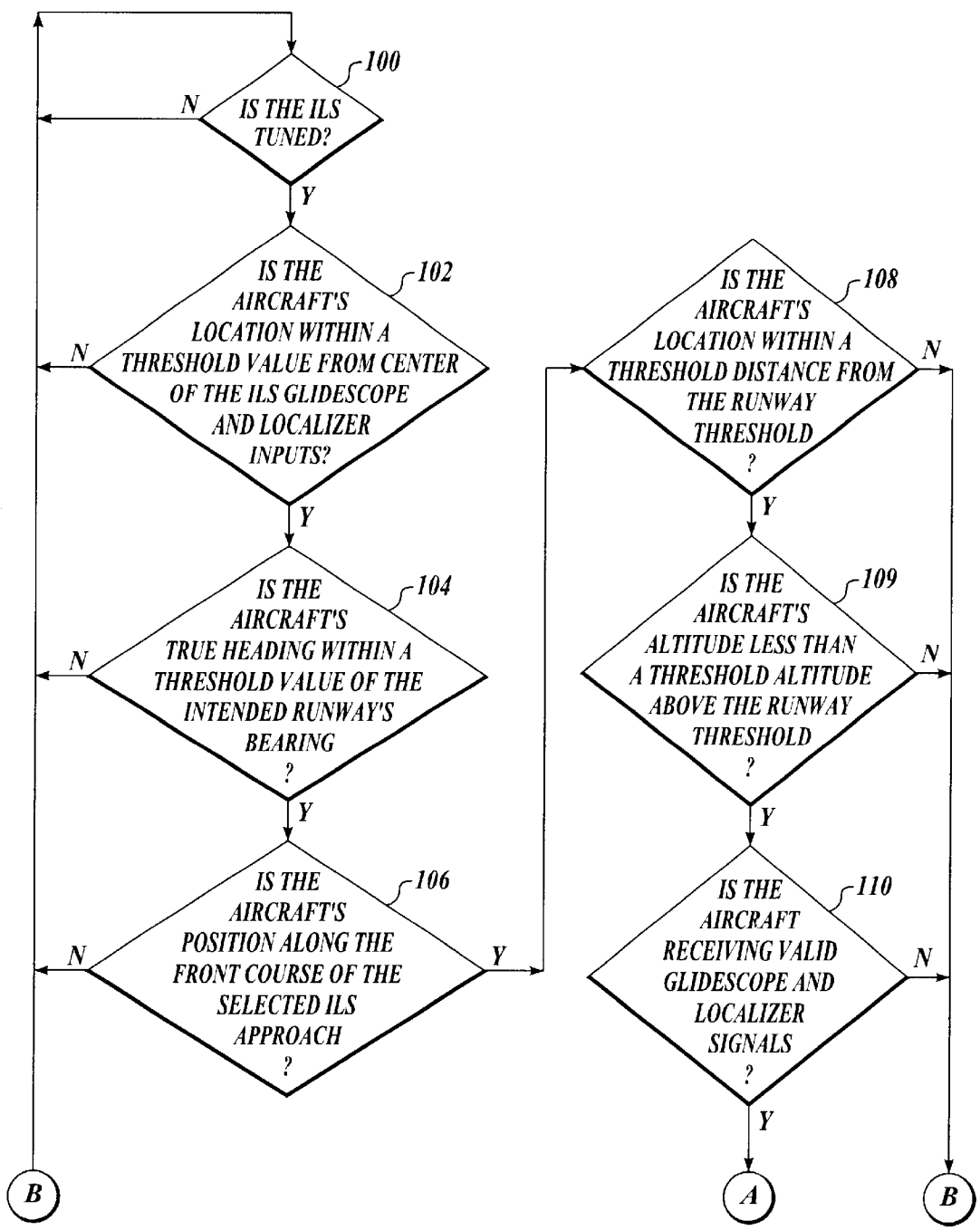
FIGS. 4A and B show a flow diagram performed by the components of FIG. 3.
Figure 4B:
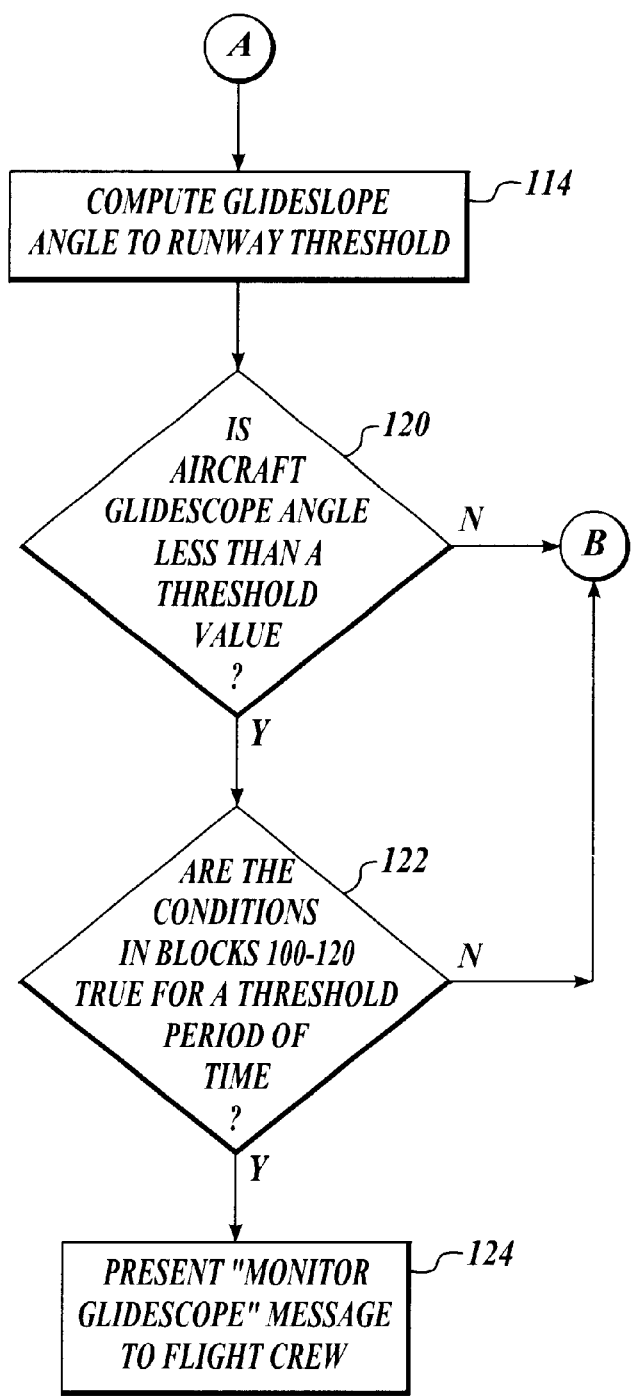

FIGS. 4A and 4B describe the process performed by glideslope monitor processing component 52 in more detail below. If the glideslope monitor processing component 52 determines that the glideslope signal received from the instrument landing system 56 is not accurate relative to the aircraft's actual glideslope, the processing component 52 sends a signal to the navigation indicator 58, directing the navigation indicator 58 to alert the flight crew of the situation. An example of an alert to the flight crew would be a "monitor glideslope" audible presentation over the flight crew's headsets.

FIGS. 4A and 4B illustrate a preferred process performed by the system shown in FIG. 3. Although FIGS. 4A and 4B illustrate a series of decisions performed one after the other, it can be appreciated that these steps may be performed concurrently or in any order as long as all of the conditions are met before the final step. First, at decision block 100, the glideslope monitor processing component 52 determines if the ILS is tuned to receive ILS signals. This can simply be receiving a signal from the instrument landing system 56 that indicates that the ILS is tuned. If the ILS approach is not tuned, the process discontinues and returns to decision block 100. Next, at decision block 102, the processing component 52 determines whether the present aircraft location is within a threshold value from the center or zero values of the ILS approach glideslope and heading. In one embodiment, the threshold value from center of the approach glideslope and heading is a single dot as displayed on the AAI 30. The ILS component 56 receives from the land-based ILS 60 glideslope and localizer signals and determines where the aircraft is relative to the ILS glideslope and directional centers. Essentially, the information sent from the ILS component 56 to the navigation indicator 58 includes signals that have a determined relevance to the glideslope and directional centerlines of the ILS approach. A dot translates to a pre-set angular value from the center of the glideslope and heading. If the condition in the decision block 102 is not satisfied, the process returns to decision block 100, otherwise, the process continues on to decision block 104.

At decision block 104, the processing component 52 determines whether the aircraft's true heading is within a threshold value of the intended runway's bearing. The processing component 52 simply subtracts the bearing of the selected runway as retrieved from local memory, from the aircraft's true track over ground as determined by a flight management system (FMS) that may include global positioning system receiver and processor. An example threshold value is 30 degrees, but could be any other value depending upon the relationship of the ILS approach to the intended runway. If the condition of decision block 104 is not met the process returns, like decision block 102, to decision block 100, otherwise, the process continues on to decision block 106. At decision block 106, the processing component 52 determines whether the aircraft is positioned along the front course of the selected ILS approach. The information regarding whether the aircraft is positioned along the front course of the selected ILS approach is a determination of aircraft's present position and the designs of the selected ILS approach and is preferably an on/off signal generated by the ILS component 56. If the condition at decision block 106 is not met, the process returns to block 100, otherwise, the process continues on to decision block 108.

Next, at decision block 108, the processing component 52 determines whether the aircraft's location is within a threshold distance range from the runway threshold or end. The aircraft's distance from the runway threshold is calculated by first taking aircraft location as determined by the FMS or comparable component and determining a first distance from a stored runway threshold location. Then, a second distance is determined by subtracting a horizontal figure of merit (HFOM) from the first distance. HFOM is a horizontal error value determined for the position source being used. Next, the distance from runway threshold is determined by subtracting a runway quality factor from the second distance. The runway quality factor is a pre-determined value that is based on the quality of the location information of the associated runway. An example of a threshold distance range is greater than two miles and less than ten nautical miles. If the condition at decision block 108 is not met, the process returns to block 100, otherwise, the process continues on to block 109. Next, at decision block 109, the processing component 52 determines whether the aircraft's altitude is less than a threshold altitude above the runway threshold. An example of threshold altitude above the runway threshold is a thousand feet. The aircraft's altitude is first determined by adding a geometric altitude vertical figure of merit (VFOM) to the aircraft's geometric altitude and then subtracting the elevation of the runway. VFOM is a vertical error value of geometric altitude that is also generated by the EGPWS. An example system that generates geometric altitude and VFOM is the Enhanced Ground Proximity Warning System (EGPWS) produced by Honeywell. If the condition at decision block 109 is not met, the process returns to block 100, otherwise, the process continues on to decision block 110. Next, at decision block 110, the process determines whether the aircraft is receiving valid glideslope and localizer signals from the land-based ILS 60. The valid signals are logical 1 signals that indicate valid signal output and that are sent to the ILS component 56 by the land-based ILS 60. If the condition of decision block 110 is not met, the process returns to block 100, otherwise, the process continues to decision block 120.

At decision block 120, the process determines whether the aircraft's glideslope angle to the runway threshold is less than a threshold value. The glideslope angle is determined by taking the arc tangent of the aircraft's height above the field divided by the determined aircraft distance from runway threshold times feet per nautical mile. See Equation (1).

$$GlideslopeAngle = ArcTan \frac{HeightAboveRunway}{(DistancefromRunwayThreshold)6076.11 \text{ ft/nm}} \quad (1)$$

Typically glideslopes of ILS approaches are anywhere between 2.5 degrees and 3.5 degrees, therefore an example glideslope angle threshold value would be somewhere on the order of 2 degrees. If the condition at decision block 120 is not met, the process returns to block 100, otherwise, all the base conditions have been met for alerting the flight crew other than a time condition shown in decision block 122. At decision block 122, the process determines if all the conditions from blocks 100–120 have been met for a threshold period of time. If it is determined at decision block 122 that all the conditions have been met for the threshold period of time, the process presents a message to the flight crew informing them to check their present position on the ILS approach, see block 124. An example presented message is "monitor glideslope" that is sent through the headset of the flight crew or over a cockpit speaker system. If the condition of decision block 122 is not met, the process returns to block 100.

The steps of the process shown in FIGS. 4A and B are performed in whole or in part in the ILS component 56 or the glideslope monitor processing component 52. As noted above, each decision step of the process returns to the first decision block 100 if the condition is not met. However, the present invention sends the results of each decision as a logical 1 (condition met) or 0 (condition not met) to an AND gate. If the result of the AND gate equals 1, then all sent conditions were equal to 1. If the result of the AND gate equals 0, then at least one sent condition equals 0. In this manner, the conditions are states that are checked periodically, at different periodic rates depending upon the task.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for alerting an aircraft flight crew of an inconsistency during an instrument landing system (ILS) approach to a selected runway, the method comprising:
   receiving glideslope and localizer signals;
   determining aircraft approach angle to runway end; and
   alerting the aircraft flight crew of an approach inconsistency, if the determined aircraft approach angle to runway end is less than a threshold angular value and one or more parameters based on aircraft position and the received glideslope and localizer signals are met.

2. The method of claim 1, wherein determining aircraft approach angle to runway end is based on aircraft geometric altitude, a vertical figure of merit, a horizontal figure of merit, runway elevation, and aircraft distance to runway threshold.

3. The method of claim 1, wherein one of the one or more parameters comprises valid glideslope and localizer signals.

4. The method of claim 1, wherein one of the one or more parameters comprises the aircraft being on the front course of the ILS approach.

5. The method of claim 1, wherein one of the one or more parameters comprises the aircraft being within a distance range from the selected runway based on distance to selected runway threshold, horizontal figure of merit, and a runway quality factor.

6. The method of claim 1, wherein one of the one or more parameters comprises the aircraft being within an angular range from the selected runway based on aircraft true track and selected runway bearing.

7. The method of claim 1, wherein one of the one or more parameters comprises the aircraft being below a height above runway altitude value based on geometric altitude, a vertical figure of merit, and runway elevation.

8. The method of claim 1, wherein one of the one or more parameters comprises the received glideslope and localizer signals indicating that the aircraft is within threshold values of center of the ILS approach.

9. A computer program product for alerting an aircraft flight crew of an inconsistency during an instrument landing system (ILS) approach to a selected runway, the computer program product comprising:
   first computer readable program means for receiving glideslope and localizer signals;
   second computer readable program means for determining aircraft approach angle to runway end; and
   third computer readable program means for alerting the aircraft flight crew of an approach inconsistency, if the determined aircraft approach angle to runway end is less than a threshold angular value and one or more parameters based on aircraft position and the received glideslope and localizer signals are met.

10. The computer program product of claim 9, wherein the second computer readable program means for determining aircraft approach angle to runway end determines aircraft approach angle to runway end based on aircraft geometric altitude, a vertical figure of merit, a horizontal figure of merit, runway elevation, and aircraft distance to runway threshold.

11. The computer program product of claim 9, wherein one of the one or more parameters comprises valid glideslope and localizer signals.

12. The computer program product of claim 9, wherein one of the one or more parameters comprises the aircraft being on the front course of the ILS approach.

13. The computer program product of claim 9, wherein one of the one or more parameters comprises the aircraft being within a distance range from the selected runway based on distance to selected runway threshold, horizontal figure of merit, and a runway quality factor.

14. The computer program product of claim 9, wherein one of the one or more parameters comprises the aircraft being within an angular range from the selected runway based on aircraft true track and selected runway bearing.

15. The computer program product of claim 9, wherein one of the one or more parameters comprises the aircraft being below a height above runway altitude value based on geometric altitude, a vertical figure of merit, and runway elevation.

16. The computer program product of claim 9, wherein one of the one or more parameters comprises the received glideslope and localizer signals indicating that the aircraft is within threshold values of center of the ILS approach.

17. An apparatus for alerting an aircraft flight crew of an inconsistency during an instrument landing system (ILS) approach to a selected runway, the apparatus comprising:
   a component configured to receive glideslope and localizer signals;
   a component configured to determine aircraft approach angle to runway end; and
   a component configured to alert the aircraft flight crew of an approach inconsistency, if the determined aircraft approach angle to runway end is less than a threshold angular value and one or more parameters based on aircraft position and the received glideslope and localizer signals are met.

18. The apparatus of claim 17, wherein the component configured to determine aircraft approach angle to runway end determines the aircraft approach angle to runway end based on aircraft geometric altitude, a vertical figure of merit, a horizontal figure of merit, runway elevation, and aircraft distance to runway threshold.

19. The apparatus of claim 17, wherein one of the one or more parameters comprises valid glideslope and localizer signals.

20. The apparatus of claim 17, wherein one of the one or more parameters comprises the aircraft being on the front course of the ILS approach.

21. The apparatus of claim 17, wherein one of the one or more parameters comprises the aircraft being within a distance range from the selected runway based on distance to selected runway threshold, horizontal figure of merit, and a runway quality factor.

22. The apparatus of claim 17, wherein one of the one or more parameters comprises the aircraft being within an angular range from the selected runway based on aircraft true track and selected runway bearing.

23. The apparatus of claim 17, wherein one of the one or more parameters comprises the aircraft being below a height above runway altitude value based on geometric altitude, a vertical figure of merit, and runway elevation.

24. The apparatus of claim 17, wherein one of the one or more parameters comprises the received glideslope and localizer signals indicating that the aircraft is within threshold values of center of the ILS approach.

* * * * *